United States Patent
Mori

(10) Patent No.: US 7,698,053 B2
(45) Date of Patent: Apr. 13, 2010

(54) ECONOMY RUNNING SYSTEM, ECONOMY RUNNING CONTROLLER AND NAVIGATION APPARATUS

(75) Inventor: Naoto Mori, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 310 days.

(21) Appl. No.: 11/389,137

(22) Filed: Mar. 27, 2006

(65) Prior Publication Data

US 2006/0224279 A1    Oct. 5, 2006

(30) Foreign Application Priority Data

Mar. 30, 2005    (JP)    ............... 2005-098040

(51) Int. Cl.
*F02N 17/00*    (2006.01)

(52) U.S. Cl. ............... 701/112; 123/179.4; 123/179.14; 477/11; 477/20; 180/170

(58) Field of Classification Search ............... 701/1, 701/101, 112; 180/287, 65.2, 170; 123/179.4, 123/179.14, 339.16, 179.5; 477/10, 11, 19, 477/20; 340/425.5, 514; *F02N 17/00*
See application file for complete search history.

(56) References Cited

U.S. PATENT DOCUMENTS

| | | | | |
|---|---|---|---|---|
| 5,764,139 | A * | 6/1998 | Nojima et al. | 340/461 |
| 6,802,291 | B2 * | 10/2004 | Ujifusa | 123/179.4 |
| 6,913,558 | B2 * | 7/2005 | Mori et al. | 477/3 |
| 6,924,734 | B2 * | 8/2005 | Nagasaka et al. | 340/426.15 |
| 6,977,582 | B2 * | 12/2005 | Ota et al. | 340/457.1 |
| 7,066,126 | B2 * | 6/2006 | Tokuyasu et al. | 123/179.17 |
| 7,204,222 | B2 * | 4/2007 | Yamauchi et al. | 123/179.4 |
| 7,458,353 | B2 * | 12/2008 | Takahashi | 123/179.4 |
| 2002/0020575 | A1 * | 2/2002 | DeLuca et al. | 180/275 |
| 2002/0028726 | A1 * | 3/2002 | Morimoto et al. | 477/102 |
| 2002/0074173 | A1 * | 6/2002 | Morimoto et al. | 180/65.2 |
| 2002/0116113 | A1 * | 8/2002 | Kaneko | 701/112 |
| 2004/0004398 | A1 * | 1/2004 | Nagasaka et al. | 307/10.5 |
| 2004/0089258 | A1 * | 5/2004 | Buglione et al. | 123/179.4 |
| 2004/0098968 | A1 * | 5/2004 | van Nieuwstadt et al. | 60/277 |
| 2004/0159479 | A1 | 8/2004 | Morimoto et al. | |
| 2004/0216719 | A1 * | 11/2004 | Condemine et al. | 123/406.47 |
| 2005/0096934 | A1 * | 5/2005 | Wakui et al. | 705/1 |
| 2005/0179320 | A1 * | 8/2005 | Shimomura | 307/10.4 |
| 2005/0199209 | A1 * | 9/2005 | Shimokawa et al. | 123/179.4 |

(Continued)

FOREIGN PATENT DOCUMENTS

JP    A 7-332123    12/1995

(Continued)

*Primary Examiner*—Tuan C To
(74) *Attorney, Agent, or Firm*—Oliff & Berridge, PLC.

(57) ABSTRACT

An economy running system having: a function of stopping an internal combustion engine of a vehicle when the vehicle stops and all of stop conditions are satisfied; and a function of restarting the internal combustion engine of the vehicle. The economy running system includes: a control unit that judges whether the vehicle stops or not, and judges whether each of the stop conditions is satisfied or not; and a notification unit. When the control unit judges that the vehicle stops and that at least one of the stop conditions is not satisfied, the control unit causes the notification unit to notify to a user first notification information concerned with the at least one of the stop conditions.

22 Claims, 9 Drawing Sheets

U.S. PATENT DOCUMENTS

| | | | |
|---|---|---|---|
| 2006/0048734 A1* | 3/2006 | Kataoka et al. | 123/179.4 |
| 2006/0048735 A1* | 3/2006 | Umezu et al. | 123/179.4 |
| 2007/0131188 A1* | 6/2007 | Hokuto | 123/179.4 |

FOREIGN PATENT DOCUMENTS

| | | |
|---|---|---|
| JP | A 2000-120463 | 4/2000 |
| JP | A 2001-88580 | 4/2001 |
| JP | A 2004-68675 | 3/2004 |
| JP | A 2005-42611 | 2/2005 |

* cited by examiner

FIG. 2

| ENGINE STOP CONDITIONS | CAUSES OF UNSATISFACTION OF THE ENGINE STOP CONDITIONS | ANSWERS |
|---|---|---|
| BONNET CLOSED STATE | BONNET IS OPENED | STOP VEHICLE AND CLOSE BONNET |
| DRIVER SEAT DOOR CLOSED STATE | DRIVER SEAT DOOR IS OPENED | STOP VEHICLE AND CLOSE DRIVER SEAT DOOR |
| STATE OF BEING NOT STOPPED ON SLOPING ROAD | VEHICLE IS STOPPED ON SLOPING ROAD | WHEN RUNNING ON FLAT LANDS, VEHICLE GOES INTO ECONOMY RUNNING STATE |
| NOT PANIC BRAKING STATE | PANIC BRAKING STATE | SHIFT THE SHIFT LEVER TO P RANGE AND RELEASE BRAKE PEDAL |
| BATTERY REQUIREMENT | ELECTRICITY STORED IN THE BATTERY IS LOWERED | RUN FOR A WHILE FOR CHARGING |
| PROHIBITION STATE DUE TO POWER STEERING | STEERING WHEEL IS ROTATED LARGELY | FIX STEERING WHEEL STRAIGHT |

| ENGINE START CONDITIONS | CAUSES OF RESTARTING ENGINE |
|---|---|
| BATTERY REQUIREMENT | ENGINE IS RESTARTED BECAUSE ELECTRICITY STORED IN THE BATTERY IS LOWERED |

FIG. 9

ECONOMY RUNNING INFORMATION

- CAUSE OF UNSATISFACTION OF STOPPING THE ENGINE
    PANIC BRAKING STATE

- ANSWER
  (ENGINE AUTOMATIC STOPPING WAY)
    SHIFT THE SHIFT LEVER TO P RANGE AND RELEASE BRAKE PEDAL

FIG. 11

ECONOMY RUNNING INFORMATION

- CAUSE OF UNSATISFACTION OF STOPPING THE ENGINE
    ELECTRICITY STORED IN THE BATTERY IS LOWERED.

ECONOMY RUNNING SYSTEM, ECONOMY RUNNING CONTROLLER AND NAVIGATION APPARATUS

BACKGROUND OF THE INVENTION

1. Field of the Invention

The present invention relates to an economy running system, an economy running controller and a navigation apparatus. More particularly, it relates to an economy running system having a function of stopping and restarting an engine in accordance with a state of a vehicle, an economy running controller and a navigation apparatus cooperated with the economy running controller.

2. Description of the Related Art

An economy running system by which an engine is stopped automatically when the engine need not be operated (while a vehicle stops, for example, to wait for a signal to change, to wait for a train to pass or to wait for a person) and by which the engine is restarted automatically when the engine needs to be operated has been recently developed and put into practice in order to reduce fuel expenses and reduce exhaust gas.

The vehicle having such an economy running system is provided with an indicator for indicating execution of automatic stopping and restarting of the engine, that is, execution of economy running to a user (driver etc.) when such economy running is executed, and the indicator for indicating non-execution of economy running to the user when such economy running is not executed. The user can confirm whether economy running is executed or not, by referring to these indicators (e.g. see JP-A-2001-88580).

In the present circumstances, the mechanism of the economy running system has been not correctly recognized yet because the economy running system has been not common to family cars. Generally, the economy running system is recognized as such a system that the engine is stopped automatically when the vehicle is stopped.

When, for example, the engine is to be stopped automatically by actual economy running control while the shift lever is in a D range, the engine can be stopped automatically when all stop conditions including the stopped state of the vehicle (the vehicle speed of 0 km/h), the accelerator off state (the released state of an accelerator pedal), the brake on state (the stepped state of a brake pedal), the non-panic braking (non-sudden braking) state, the state in which electricity stored in a battery used at the time of automatic stopping of the engine is not lower than a predetermined level, and other states are satisfied.

Accordingly, when any one of the stop conditions is unsatisfied in spite of the stopped state of the vehicle (i.e. the vehicle speed of 0 km/h), there arises a phenomenon that the engine cannot be stopped automatically. In the background art, when such a phenomenon occurs, non-execution of economy running is only indicated by the indicator. Accordingly, if the user falsely recognizes that the system should stop the engine automatically when the vehicle is stopped, the user will doubt the reason why the engine is not stopped automatically in spite of the stopped state of the vehicle. Moreover, a fear that the economy running control does not work normally is given to the user. There is a problem that the user may mistake this state for an accident.

There is assumed the case where the user performs a predetermined operation to lead the unsatisfied stop condition into a satisfied condition to stop the engine automatically when such a phenomenon occurs. For example, in the system in which stopping of the engine by sudden braking is recognized as a "panic braking state", the engine is not stopped automatically even in the case where the vehicle is stopped by sudden braking. In this case, when the shift lever is shifted to a P range and the brake is turned off (the brake pedal is released), the "panic braking state" can be cancelled. By this operation, the engine can be stopped automatically.

It is however impossible to stop the engine automatically by the economy running control if the user does not correctly understand a cause of unsatisfaction of stopping the engine automatically (i.e. the unsatisfied stop condition) and a way to cope with the cause. It is not easy for the general user to correctly understand the plurality of stop conditions and the way to cope with the unsatisfaction of automatic stopping the engine in advance. For this reason, there is a problem that it is difficult for the user to use the functions of the economy running system efficiently.

SUMMARY OF THE INVENTION

The present invention has been made in view of the above circumstances and provides an economy running system. According to an embodiment of the invention, the economy running system can deepen user's understanding and comfort with respect to the economy running system so that even a general user not having sufficient knowledge of the economy running system can efficiently use functions provided in the economy running system to thereby bring the effect of economy running control into full play, an economy running controller and a navigation apparatus cooperating with the economy running controller.

According to a first aspect of the invention there is provided an economy running system having a function of stopping an internal combustion engine of the vehicle when the vehicle stops and all of stop conditions are satisfied; and a function of restarting the internal combustion engine of a vehicle. The economy running system includes a control unit that judges whether the vehicle stops or not, and judges whether each of the stop conditions is satisfied or not; and a notification unit. When the control unit judges that the vehicle stops and that at least one of the stop conditions is not satisfied, the control unit causes the notification unit to notify to a user first notification information concerned with the at least one of the stop conditions.

According to above configuration, when the condition for stopping the internal combustion engine is unsatisfied in spite of the vehicle stops, that is, when the internal combustion engine cannot be stopped though the vehicle is stopped, information concerned with the unsatisfied stop condition is notified to the user. Accordingly, information concerned with the unsatisfied stop condition can be notified to the user so that the user can grasp the reason why the internal combustion engine cannot be stopped in spite of the stopped state of the vehicle. Accordingly, user's understanding and comfort with respect to the economy running system can be deepened so that the user can be prevented from confusing the unsatisfied stop condition with an accident.

Incidentally, the condition for stopping the internal combustion engine is satisfied when a plurality of states are established simultaneously. The plurality of states include: a state in which the vehicle is stopped; a state in which a brake pedal is stepped; a state in which a shift lever is located in a predetermined position; a state in which an accelerator pedal is released; a state in which electricity stored in a battery is not lower than a predetermined level; a state in which a predetermined time has passed after an ignition switch is turned on; a state in which a bonnet of the vehicle is not opened; a state in which a driver seat door is not opened; a state in which a brake is not in a panic braking (sudden braking) state; a state in which the economy running controller is not abnormal; and a state in which an engine controller, a brake controller, etc. are not abnormal.

According to a second aspect of the invention, there is provided the economy running system according to the first aspect, wherein the first notification information includes at least one of the at least one of the stop conditions and information about how to satisfy the at least one of the stop conditions.

According to the above configuration, the unsatisfied stop condition (i.e. unsatisfied one of conditions for stopping the internal combustion engine) is notified to the user. Accordingly, the user can grasp the cause of unsatisfaction of stopping the internal combustion engine so that the user can understand the mechanism of the economy running system accurately. An answer to lead the unsatisfied stop condition into a satisfied condition (i.e. an answer to lead unsatisfied one of conditions for stopping the internal combustion engine into a satisfied condition) is also notified to the user. Accordingly, the user can be urged to lead the unsatisfied stop condition into a satisfied condition, so that the user can efficiently use functions provided in the economy running system to thereby bring the effect (e.g. a fuel saving effect due to increase in number of automatic stopped states of the engine) of economy running control into full play even if the user is a general user not having sufficient knowledge of the economy running system.

According to a third aspect of the invention, there is provided the economy running system according to the first aspect, wherein the economy running system restarts the internal combustion engine the a vehicle when at least one of start conditions is satisfied, wherein the control unit judges whether each of the start conditions is satisfied; and wherein when at least one of the start conditions is satisfied and the internal combustion engine restarts, the control unit causes the notification unit to notify second notification information concerned with the at least one of the start conditions.

According to the above configuration, when the certain start condition is satisfied to restart the internal combustion engine, information concerned with the satisfied start condition is notified to the user. Accordingly, the user can grasp the start condition for restarting the internal combustion engine, so that user's understanding and comfort with respect to the economy running control (especially, control at the restarting time) can be deepened.

According to a fourth aspect of the invention, there is provided the economy running system according to the third aspect, wherein the start conditions include a condition which requiring a user to perform no of operation for restarting the internal combustion engine.

According to the above configuration, the start condition is a starting condition (e.g. a condition for restarting the internal combustion engine when electricity stored in a battery is not higher than a predetermined level) which does not require any user's operation of restarting the internal combustion engine (such as an accelerator pedal stepping operation, a brake pedal releasing operation). Accordingly, when the internal combustion engine is restarted without user's operation of restarting the internal combustion engine, that is, regardless of user's intention, the user can grasp the reason why the internal combustion engine is restarted. User's understanding and comfort with respect to the economy running control (especially, control at the restarting time) can be deepened more greatly.

According to a fifth aspect of the invention, there is provided the economy running system according to the first aspect, wherein a content type of the first notification information is changeable to another one of a plurality of the content types of the first notification information.

According to the above configuration, examples of the content type include: a type to notify only the unsatisfied stop condition (information 1); a type to notify only the answer to lead the unsatisfied stop condition into a satisfied condition (information 2); a type to notify both the information 1 and the information 2; and a type not to notify any information. The content type can be switched to any one of the aforementioned types in accordance with the notification content or significance of information concerned with the unsatisfied stop condition or the state of the vehicle.

According to a sixth aspect of the invention, there is provided the economy running system according to the fifth aspect, further including: an input unit that input one of the notification content types; wherein the first notification information is notified according to the one of the content types.

According to the above configuration, the content type can be switched in accordance with information inputted by the input unit because the content type of information concerned with the unsatisfied stop condition can be switched on the basis of information inputted by the input unit for inputting the content type. The user can switch the content type arbitrarily in accordance with the degree of user's understanding of the economy running system, that is, in accordance with the necessity of notification or the like, so that the content type according to the user's demand and request can be used.

According to a seventh aspect of the invention, there is provided the economy running system according to the first aspect, wherein a way of notifying the first notification information is changeable to another one of a plurality of ways of notifying the first notification information.

According to the above configuration, examples of the notification way include: a way of outputting an image on a display portion by using characters, graphics, etc.; a way of outputting voice by synthesizing the notification content acoustically; and a way of outputting an image and outputting voice. The notification way can be switched to any one of the aforementioned notification ways in accordance with the content or significance of information concerned with the unsatisfied stop condition or the state of the vehicle.

According to a eighth aspect of the invention, there is provided the economy running system according to the seventh aspect, further including: an input unit that input one of the ways of notifying; wherein the first notification information is notified by the one of the ways of notifying.

According to the above configuration, the notification way can be switched in accordance with information inputted by the input unit because the notification way of information concerned with the unsatisfied stop condition can be switched on the basis of information inputted by the input unit for inputting the notification way. The user can switch the notification way arbitrarily in accordance with the user's favorite etc., so that the notification way according to the user's demand and request can be used.

According to a ninth aspect of the invention, there is provided the economy running system according to the first aspect, wherein the notification unit includes a navigation apparatus; and wherein at least the first notification information is notified through the navigation apparatus.

According to the above configuration, at least information concerned with the unsatisfied stop condition is notified to the user through the navigation apparatus. Accordingly, the image output function and the voice output function provided in the navigation apparatus can be used so that information concerned with the unsatisfied stop condition and information concerned with the satisfied start condition can be notified to the user so as to be easy to understand.

According to a tenth aspect of the invention, there is provided the economy running system according to the ninth aspect, wherein it is changeable which one of a function of notifying the first notification information and a function of navigation by the navigation apparatus is given a higher priority than the other.

According to the above configuration, a function to be given high priority can be selected from a function of notifying information concerned with the unsatisfied stop condition to the user and a function of navigation of the navigation apparatus. Accordingly, when the function of navigation of the navigation apparatus is selected as the function to be given high priority, the function of navigation can be prevented from being spoiled by the function of notifying. On the other hand, when the function of notifying is selected as the function to be high given priority, information concerned with the unsatisfied stop condition can be notified to the user surely regardless of use of the function of navigation.

According to a eleventh aspect of the invention, there is provided the economy running system according to the tenth aspect, further including: an input unit that inputs information about which one of the function of notifying the first notification information and the function of navigation is given a higher priority.

According to the above configuration, either of the function of notifying information concerned with the unsatisfied stop condition to the user and the function of navigation can be selected as the function to be given high priority on the basis of information inputted by the input unit for inputting the high priority function because the function to be given high priority can be switched on the basis of information inputted by an input unit for inputting the high priority function. Accordingly, the user can switch the priority function arbitrarily.

According to a twelfth aspect of the invention, there is provided the economy running system according to the tenth aspect, wherein which one of the function of notifying the first notification information and the function of navigation changes based on information concerned with a position of the vehicle estimated by the navigation apparatus.

According to the above configuration, the function to be given high priority can be switched on the basis of information containing information concerned with the position of the vehicle estimated by the navigation apparatus. Accordingly, the system can be provided as a system in which the function to be given high priority can be switched appropriately in accordance with information including the information concerned with the position of the vehicle estimated by the navigation apparatus (such as the situation of the road on which the vehicle is located, the peripheral facilities and the state of the vehicle at that time), that is, in consideration of priority for stopping the internal combustion engine.

According to a thirteenth aspect of the invention, there is provided an economy running controller performing: a control for stopping an internal combustion engine of a vehicle when the vehicle stops and all of stop conditions are satisfied; and a control for restarting the internal combustion engine of the vehicle. The economy running controller includes a stop judging unit that judges whether the vehicle stops or not, and judges whether each of the stop conditions is satisfied or not; and a notification control unit; wherein when stop judging unit judges that the vehicle stops and judges that at least one of the stop conditions is not satisfied, the notification control unit performs control for notifying to a user a first notification information concerned with the at least one of the stop conditions.

According to the above configuration, the stop judging unit judges whether a condition for stopping the internal combustion engine is unsatisfied in spite of the vehicle stops or not. When the stop judging unit makes a decision that the condition for stopping the internal combustion engine is unsatisfied in spite of the vehicle stops, the notification control unit performs control to notify information concerned with the unsatisfied stop condition to the user. Accordingly, the state in which the condition for stopping the internal combustion engine is unsatisfied in spite of the vehicle stops can be judged accurately so that information concerned with the unsatisfied stop condition corresponding to the state can be notified to the user. The user can grasp the reason why the internal combustion engine cannot be stopped in spite of the vehicle stops. Accordingly, user's understanding and comfort with respect to the economy running control can be deepened so that the user can be prevented from confusing the unsatisfied stop condition with an accident.

According to a fourteenth aspect of the invention, there is provided the economy running controller according to the thirteenth aspect, wherein the notification control unit performs control for notifying to the user the first notification information through an on-vehicle apparatus having at least one of an image output function and a voice output function.

According to the above configuration, the notification control unit performs control to notify information concerned with the unsatisfied stop condition to the user through the on-vehicle apparatus. Accordingly, when the economy running controller is made to cooperate with the on-vehicle apparatus such as a navigation apparatus, an audio apparatus or an apparatus for controlling a meter panel having a display portion, information concerned with the unsatisfied stop condition can be notified to the user so as to be easy to understand.

According to a fifteenth aspect of the invention, there is provided the economy running controller according to the fourteenth aspect, wherein of the economy running controller restarts the internal combustion engine of the vehicle when at least one of start conditions is satisfied. The economy running controller further includes a restart judging unit judges whether each of the start conditions is satisfied; wherein when the restart judging unit judges that at least one of the start conditions is satisfied and the internal combustion engine restarts, the notification control unit performs control for notifying to a user a second notification information concerned with the at least one of the start conditions.

According to the above configuration, the restart judgment unit judges whether a certain start condition is satisfied to restart the internal combustion engine or not. When the restart judgment unit makes a decision that the certain start condition is satisfied to restart the internal combustion engine, the notification control unit performs control to notify information concerned with the satisfied start condition to the user. Accordingly, the user can grasp the start condition for restarting the internal combustion engine, so that user's understanding and comfort with respect to the economy running control (especially, control at the restarting time) can be deepened.

According to a sixteenth aspect of the invention there is provided, the economy running controller according to fifteenth aspect, wherein the notification control unit performs control for notifying to the user the second notification information through an on-vehicle apparatus having at least one of an image output function and a voice output function.

According to the above configuration, the notification control unit performs control to notify information concerned with the satisfied start condition to the user through the on-vehicle apparatus. Accordingly, when the economy running controller is made to cooperate with the on-vehicle apparatus such as a navigation apparatus, an audio apparatus or an apparatus for controlling a meter panel having a display portion, information concerned with the satisfied start condition can be notified to the user so as to be easy to understand.

According to a seventeenth aspect of the invention, there is provided a navigation apparatus being connected to an economy running controller performing: a control for stopping an internal combustion engine of a vehicle when the vehicle stops and all of stop conditions are satisfied; and a control for restarting the internal combustion engine of the vehicle. The economy running controller includes a stop judging unit that judges whether the vehicle stops or not, and judges whether each of the stop conditions is satisfied or not; and a notification control unit; wherein when the stop judging unit judges that the vehicle stops and judges that at least one of the stop conditions is not satisfied, the notification control unit transmits a notification control signal to the navigation apparatus. The navigation apparatus includes a notification unit that notifies to the user first notification information concerned with the at least one of the stop conditions based on the notification control signal from the economy running controller.

According to the above configuration, the notification unit notifies at least information concerned with the unsatisfied stop condition to the user on the basis of a notifying control signal given from the economy running controller. Accordingly, at least information concerned with the unsatisfied stop condition can be notified to the user through the navigation apparatus, so that the function of the navigation apparatus can be improved more greatly.

According to a eighteenth aspect of the invention, there is provided the navigation apparatus according to the seventeenth aspect, further including: a content type setting unit that sets a content type of the first notification information.

According to the above configuration, the content type of information concerned with the unsatisfied stop condition can be set arbitrarily by the content type setting unit. Accordingly, setting of the economy running controller can be performed easily through the navigation apparatus.

According to a nineteenth aspect of the invention, there is provided the navigation apparatus according to the seventeenth aspect, further including: a notification way setting unit that sets a way of notifying the first notification information.

According to the above configuration, the notification way of information concerned with the unsatisfied stop condition to be notified to the user can be set arbitrarily by the notification way setting unit. Accordingly, setting of the economy running controller can be performed easily through the navigation apparatus.

According to a twentieth aspect of the invention, there is provided the navigation apparatus according to seventeenth aspect, further including: a priority setting unit that sets which one of the function of notifying the first notification information and a function of navigation by the navigation apparatus is given a higher priority.

According to the above configuration, either of a function of notifying of the notification unit and a function of navigation can be set easily and arbitrarily as a function to be given high priority by the priority setting unit.

According to a twenty-first aspect of the invention, there is provided the navigation apparatus according to the seventeenth aspect, further including: a priority judging unit that judges which one of the function of notifying the first notification information and a function of navigation by the navigation apparatus is given a higher priority; wherein when the priority judging unit judges the function of navigation is given a higher prior than the other, the first notification information is not notified by the notification unit.

According to the above configuration, the priority judgment unit judges which one of functions is given high priority, the function of notifying of the notification unit or the function of navigation. When the priority function judgment unit makes a decision that the function of navigation is given high priority, the function of notifying of the notification unit is not used. Accordingly, when the priority in use of the function of navigation is high, the function of notifying of the notification unit is not used so that the function of navigation can be prevented from being disturbed by the function of notifying.

According to a twenty-second aspect of the invention, there is provided the navigation apparatus according to the seventeenth aspect, wherein the priority judging unit judges which one of the function of notifying the first notification information and the function of navigation by the navigation apparatus is given a higher priority based on a priority of stopping the internal combustion engine.

According to the above configuration, the priority judgment unit judges which one of the functions is given high priority on the basis of priority for stopping the internal combustion engine. Accordingly, in a situation in which the priority for stopping the internal combustion engine is high (e.g. in a situation in which it is particularly necessary to save fuel), the function of notifying of the notification unit can be given high priority. On the other hand, in a situation in which the priority for stopping the internal combustion engine is low (e.g. in a situation in which rapid acceleration is required because the vehicle is located in the head of a right turn lane of a crossroads), the function of navigation can be given priority. The priority function can be switched automatically in accordance with surroundings of the vehicle, that is, while the function to be given high priority by the user is predicted.

BRIEF DESCRIPTION OF THE DRAWINGS

Embodiments of the present invention will be described in detail based on the following figures, wherein:

FIG. 2 is a view for explaining information concerned with unsatisfied stop conditions stored in an ROM of an economy running ECU constituting the economy running system according to Embodiment 1;

FIG. 9 is a view showing an example of display of economy running information displayed on the display portion of the navigation apparatus constituting the economy running system according to Embodiment 1;

FIG. 11 is a view showing an example of display of economy running information displayed on the display portion of the navigation apparatus constituting the economy running system according to Embodiment 2.

DETAILED DESCRIPTION OF THE INVENTION

Figure 1:
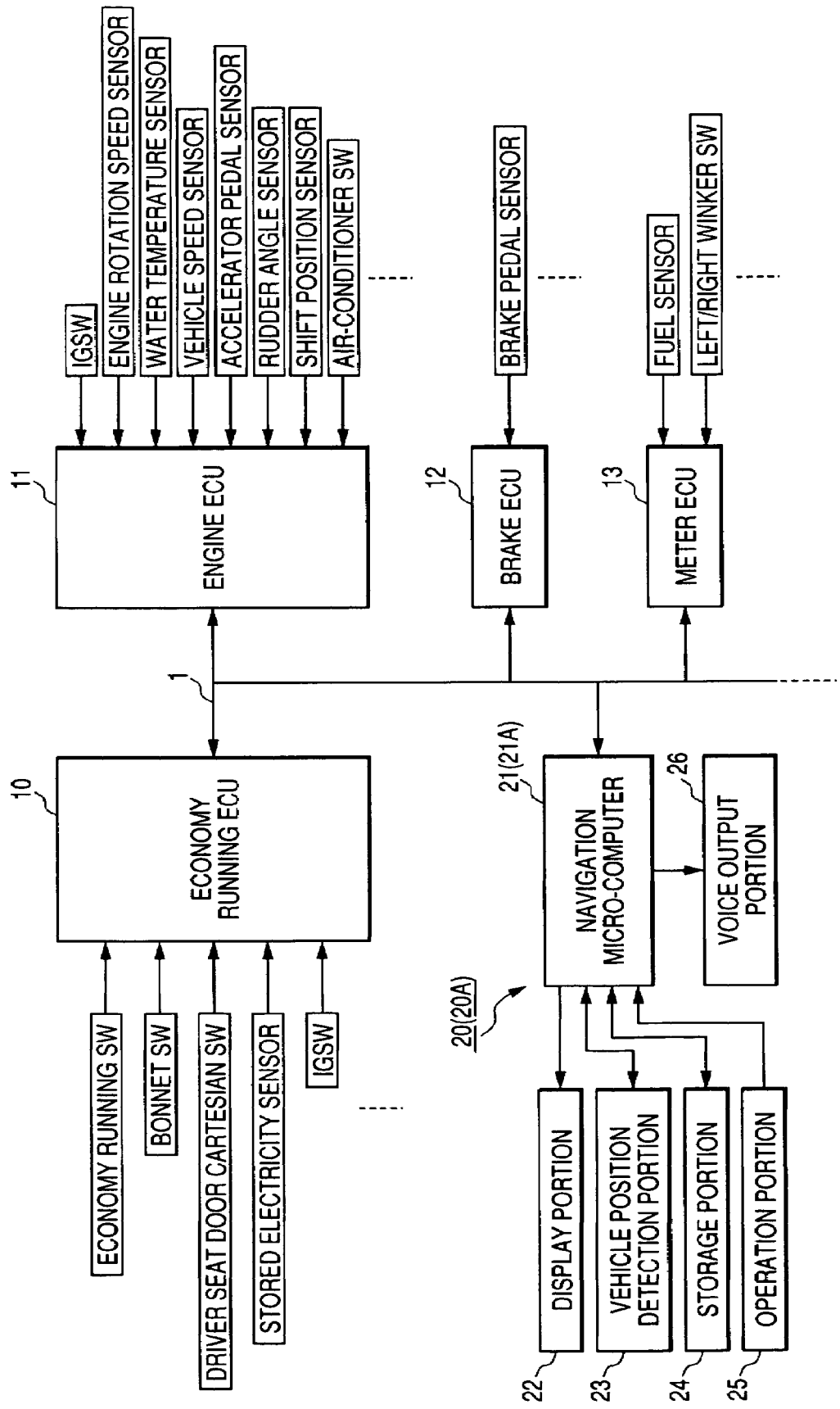
FIG. 1 is a block diagram schematically showing main part of an economy running system according to Embodiment 1 of the invention.

Embodiments of the invention as to an economy running system, an economy running controller and a navigation apparatus will be described below with reference to the drawings. FIG. 1 is a block diagram schematically showing important part of an economy running system according to Embodiment 1.

In FIG. 1, the reference numeral 10 designates an economy running ECU (Electronic Control Unit). The economy running ECU 10 is connected to an engine ECU 11, a brake ECU 12, a meter ECU 13, and a navigation micro-computer 21 through a communication line 1.

Each of these ECUs 10, 11, 12 and 13 includes a micro-computer not shown, and an input/output interface not shown but for inputting/outputting various kinds of signals. The micro-computer has a CPU for executing various kinds of processing, an ROM for storing processing programs, etc., and an RAM for temporarily storing data to be processed. The CPU executes necessary processing in accordance with processing programs read from the ROM so that various kinds of control can be executed on the basis of results of the processing.

Signals and processed data detected by the respective ECUs 10, 11, 12 and 13 are formed so that the ECUs 10, 11, 12 and 13 and the navigation micro-computer 21 communicate with one another through the communication line 1. Data communication is performed in accordance with necessity so that the ECUs 10, 11, 12 and 13 and the navigation micro-computer 21 can cooperate with one another to perform control. The ECUs 10, 11, 12 and 13 and the navigation micro-computer 21 are included in an economy running system.

An economy running system on/off (activating/non-activating) signal from an economy running switch, a bonnet open/close signal from a bonnet switch, a driver seat door open/close signal from a driver seat door Cartesian switch, a stored electricity signal from a sensor detecting electricity stored in a battery (e.g. Li battery) used in an automatic stopped state (standby state) of the engine, an ignition on/off signal from an ignition switch and other signals are input into the economy running ECU 10. The economy running ECU 10 performs economy running control (automatic stopping/restarting control) for stopping or restarting the engine in accordance with a vehicle state detected by each of the ECUs 10, 11, 12 and 13.

The ignition on/off signal from the ignition switch, an engine rotation speed signal from an engine rotation speed sensor, an engine cooling water temperature signal from a water temperature sensor attached to the engine, a vehicle speed signal from a vehicle speed sensor attached to a drive wheel, an accelerator on/off signal from an accelerator pedal sensor detecting stepping on/releasing an accelerator pedal, a steering angle signal from a rudder angle sensor, a shift position signal from a shift position sensor detecting an operating position (P, R, N, D, 2, L) of a shift lever, an air-conditioner on/off signal from an air-conditioner switch and other signals are input into the engine ECU 11. The engine ECU 11 performs engine control such as fuel injection control, and transmission control such as speed change control.

A brake on/off signal from a brake pedal sensor detecting stepping on/releasing a brake pedal and other signals required for brake control are input into the brake ECU 12. A residue signal from a fuel sensor detecting a remaining amount of fuel, an operation signal from a left/right winker switch and other signals required for controlling a meter are input into the meter ECU 13 which controls items indicated on a meter panel provided in front of the driver seat.

A display portion 22, a vehicle position detection portion 23, a storage portion 24, an operation portion 25 and a voice output portion 26 are connected to the navigation micro-computer 21. The display portion 22 includes a liquid crystal display. The vehicle position detection portion 22 includes a GPS receiver. The storage portion 24 stores data required for executing a function of navigation for map display, route search, route guide, etc. The operation portion 25 includes button switches, a touch panel, etc. provided in the display portion 22. The voice output portion 26 includes an amplifier, a speaker, etc. The navigation micro-computer 21, the display portion 22, the vehicle position detection portion 23, the storage portion 24 and the operation portion 25 are included in a navigation apparatus 20.

The economy running ECU 10 has: a function (unsatisfaction notification control unit) for performing control to notify the user of information concerned with a unsatisfied stop condition when a condition for stopping the engine is unsatisfied in spite of the stopped state of the vehicle (vehicle speed of 0 km/h); and a function (satisfaction notification control unit) for performing control to notify the user of information concerned with a satisfied starting condition when a starting condition is satisfied to restart the engine. Control is performed by the unsatisfaction notification control unit and the satisfaction notification control unit so that the user can be notified of information concerned with the unsatisfied stop condition and information concerned with the satisfied starting condition, through the navigation apparatus 20.

Incidentally, the case where a condition for stopping the engine is unsatisfied in spite of the stopped state of the vehicle includes the case where any one of conditions for stopping the engine is unsatisfied in spite of the stopped state of the vehicle. Incidentally, the conditions for stopping the engine include: a state in which the bonnet is not opened; a state in which the driver seat door is not opened; a state in which the vehicle is on such a sloping road that the vehicle cannot be stopped; a state in which the position of the shift lever is detected (not unsteady); a state in which the brake is not in a panic; a state in which the steering angle of a steering wheel is not larger than a predetermined angle; and a state in which electricity stored in the battery is not lower than a predetermined level.

The starting condition includes a starting condition not requiring any engine restarting operation (e.g. a stopped state canceling operation such as an accelerator pedal stepping operation or a brake pedal releasing operation) of the user, for example, in a state in which electricity stored in the battery becomes lower than a predetermined level.

"Information concerned with the unsatisfied stop condition" to be notified to the user is stored in the ROM of the economy running ECU 10. FIG. 2 shows part of information concerned with the unsatisfied stop condition stored in the ROM. In the information concerned with the unsatisfied stop condition shown in FIG. 2, two items for contents of notification are provided in accordance with the condition for stopping the engine. That is, two items "cause of unsatisfaction of the condition for stopping the engine" and "answer" are provided in accordance with each condition for stopping the engine. Contents of notification "unsatisfied engine stop condition" and "answer to lead the unsatisfied stop condition into a satisfied condition" are stored in accordance with each condition for stopping the engine.

Information concerned with the unsatisfied stop condition stored in the ROM is operated as follows. When the economy running ECU 10 makes a decision that an engine stop condition is unsatisfied in spite of the stopped state of the vehicle, information corresponding to the unsatisfied stop condition is read and sent together with the other notifying control information to the navigation micro-computer 21.

Figures 3, 4:
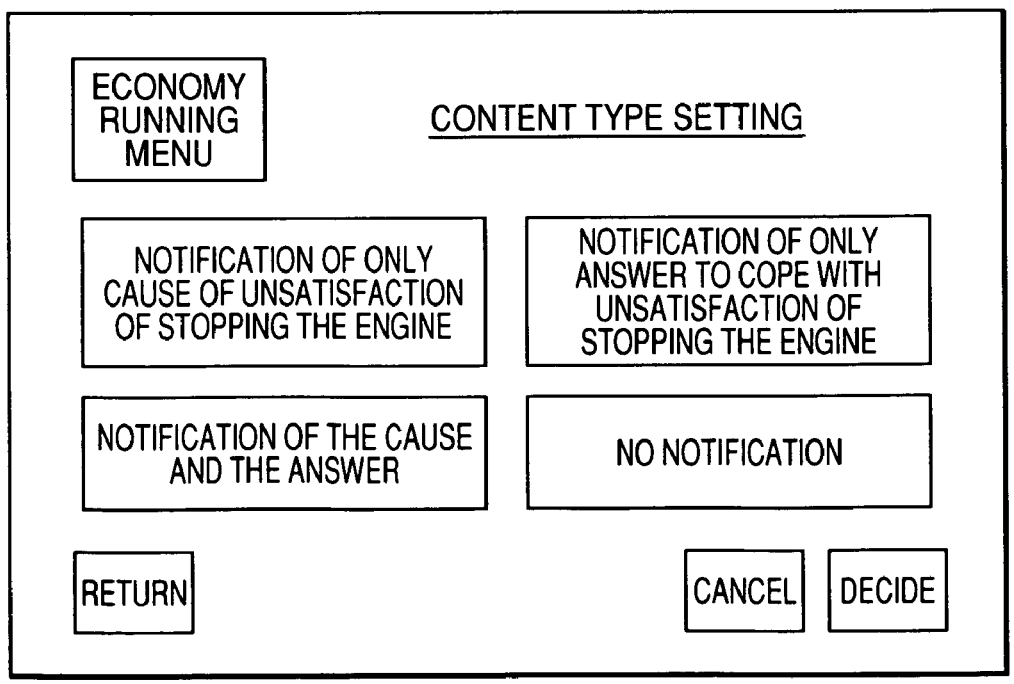
FIG. 3 is a view for explaining information concerned with satisfied start conditions stored in the ROM of the economy running ECU constituting the economy running system according to Embodiment 1.
FIG. 4 is a view showing an example of display on a content type setting screen displayed on a display portion of a navigation apparatus constituting the economy running system according to Embodiment 1.

"Information concerned with the satisfied starting condition" to be notified to the user is stored in the ROM of the economy running ECU 10. FIG. 3 shows part of information concerned with the satisfied starting condition stored in the ROM. In the information concerned with the satisfied starting condition shown in FIG. 3, a "cause of restart of the engine", that is, the content of notification of the condition for restarting the engine is stored in accordance with each condition for restarting the engine.

Information concerned with the satisfied starting condition stored in the ROM is operated as follows. When the economy running ECU 10 makes a decision that a starting condition is satisfied to restart the engine, information (the satisfied starting condition) corresponding to the starting condition triggering the restart of the engine is read and sent together with the other notifying control information to the navigation micro-computer 21.

Incidentally, the other notifying control information includes: information for setting the format of the contents of notification of information to be notified to the user; information for setting the way of notification of information to be notified to the user; and information for setting a priority function indicating which is given high priority, the economy running information function of notifying or the function of navigation.

Configuration is made so that these pieces of setting information can be set by the user through the navigation apparatus 20. FIG. 4 shows an example of display on a "content type setting" screen displayed on the display portion. Through the "content type setting" screen, the user can select a desired type suitably from the four types "notification of only a cause of unsatisfaction of stopping the engine (the unsatisfied stop condition)", "notification of only an answer to cope with unsatisfaction of stopping the engine (an answer to lead the unsatisfied stop condition into a satisfied condition)", "notification of a cause of unsatisfaction of stopping the engine and an answer to cope with the unsatisfaction" and "no notification".

For example, in the case where the user can lead the unsatisfied stop condition into a satisfied condition without notification of any answer if the user can find the unsatisfied stop condition (i.e. the user is very knowledgeable about the economy running system), the user may select "notification of only a cause of unsatisfaction of stopping the engine". For example, in the case where the user wants to stop the engine automatically but does not want to find the unsatisfied stop condition, the user may select "notification of only an answer to cope with unsatisfaction of stopping the engine". For example, in the case where the user wants to find the unsatisfied stop condition and further wants to stop the engine automatically, the user may select "notification of a cause of unsatisfaction of stopping the engine and an answer to cope with the unsatisfaction". For example, in the case where the user does not want to be notified (i.e. the user feels displeasure at notification), the user may select "no notification".

Figure 5:
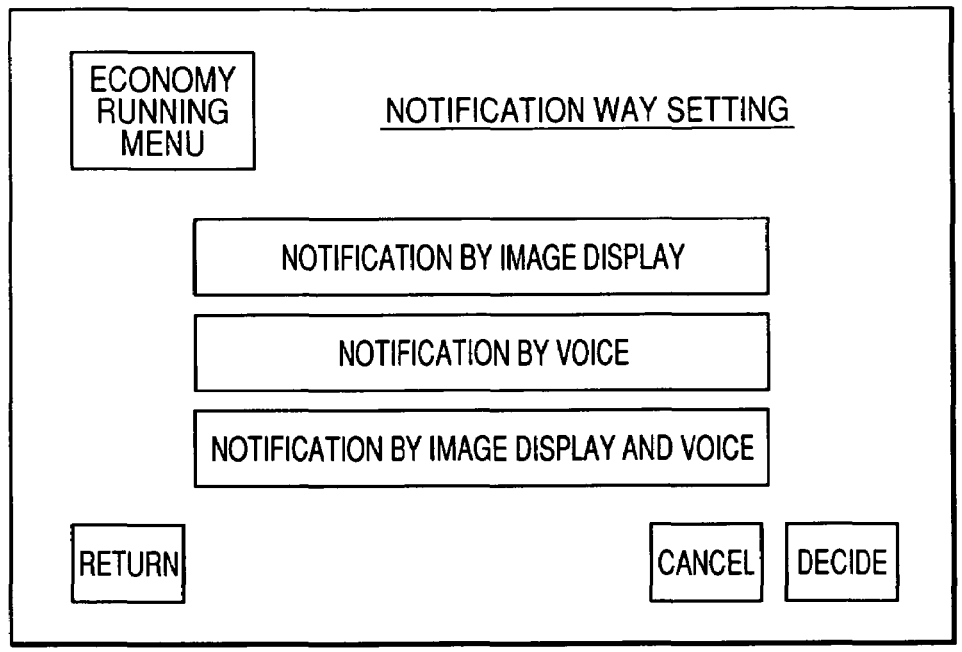
FIG. 5 is a view showing an example of display on a notification way setting screen displayed on the display portion of the navigation apparatus constituting the economy running system according to Embodiment 1.

FIG. 5 shows an example of display on a "notification way setting" screen displayed on the display portion. Through the "notification way setting" screen, the user can suitably select a desired notification way from the three notification ways "notification by image display", "notification by voice" and "notification by image display and voice".

For example, in the case where the user feels annoying for voice guidance, the user may select "notification by image display". For example, in the case where the user does not like switching of the navigation screen, the user may select "notification by voice". For example, in the case where the user wants to be notified based on image display and voice, the user may select "notification by image display and voice".

Figure 6:
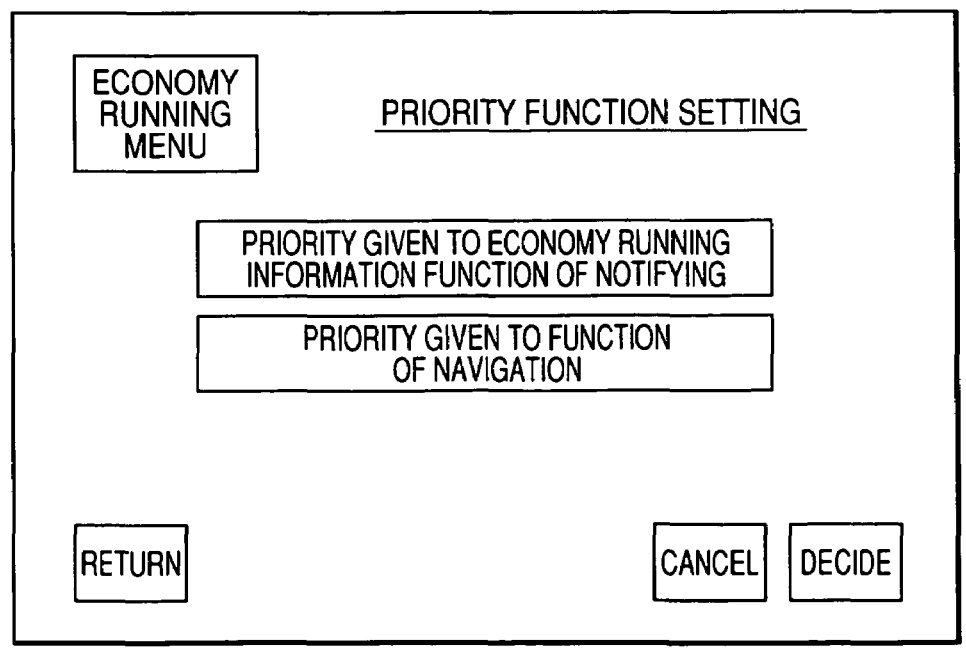
FIG. 6 is a view showing an example of display on a priority function setting screen displayed on the display portion of the navigation apparatus constituting the economy running system according to Embodiment 1.

FIG. 6 shows an example of display on a "priority function setting" screen displayed on the display portion. Through the "priority function setting" screen, the user can select suitably whether the economy running information function of notifying is given high priority ordinarily or whether the function of navigation is given high priority ordinarily. These setting screens are read suitably, for example, through a menu screen selecting operation.

Various pieces of information set through these setting screens are sent from the navigation micro-computer 21 to the economy running ECU 10. The economy running ECU 10 performs a process of changing the setting information of the content type, the notification way and the priority function to new setting information and storing the new setting information on the basis of the setting information received from the navigation micro-computer 21.

The navigation micro-computer 21 of the navigation apparatus 20 has a function (notification unit) for performing a process of notification of information concerned with the unsatisfied stop condition and information concerned with the satisfied starting condition, that is, a process of displaying these pieces of information on the display portion 22 or outputting voice from the voice output portion 26 on the basis of the notifying control signal given from the economy running ECU 10.

A processing operation carried out by the micro-computer of the economy running ECU 10 constituting the economy running system according to Embodiment 1 will be described below with reference to FIG. 7 which is a flow chart. Incidentally, the processing operation is executed repetitively at intervals of a predetermined period when the economy running switch is on.

First, in step S1, a process of inputting various kinds of signals for economy running control is executed and the situation of this routine goes to step S2. In the step S2, a judgment is made as to whether the engine is in an economy running mode or not, that is, whether the engine is stopped automatically by economy running control or not. When a decision is made that the engine is not in an economy running mode, that is, the engine is not in an automatically stopped state, the situation of the routine goes to step S3.

In the step S3, a judgment is made as to whether the economy running condition is valid or not, that is, whether all the conditions for stopping the engine are satisfied or not. When a decision is made that the economy running condition is invalid, the situation of this routine goes to step S4. In the step S4, a judgment is made as to whether the vehicle stops or not (i.e. whether the vehicle speed is equal/close to 0 km/h or not). When a decision is made that the vehicle does not stop (i.e. the vehicle is running), the situation of this routine is returned. On the other hand, when a decision is made that the vehicle is stopped, the situation of this routine goes to step S5.

In the step S5, a unsatisfied stop condition is extracted from the economy running condition and then the situation of this routine goes to step S6. In the step S6, "information concerned with the unsatisfied stop condition" corresponding to the extracted unsatisfied stop condition is read from the ROM and then the situation of this routine goes to step S7.

In the step S7, information for setting the content type of information (concerned with the unsatisfied stop condition) to be notified to the user, the notification way and the priority function is read. In the next step S8, a judgment is made as to whether the content type is set as "no information to be notified to the user". When a decision is made that the content type is set as "no information to be notified to the user", the situation of this routine is returned.

On the other hand, when a decision is made that the content type is not set as "no information to be notified to the user", that is, the content type is set as any one of "notification of only a cause of unsatisfaction of stopping the engine", "notification of only an answer to cope with the unsatisfaction of stopping the engine" and "notification of a cause of unsatisfaction of stopping the engine and an answer to cope with the unsatisfaction", the situation of this routine goes to step S9.

In the step S9, a notifying control process is performed for the navigation apparatus 20, that is, a process of sending notifying control information containing setting information concerned with the content type, the notification way and the high priority function read in the step S7 and information concerned with the unsatisfied stop condition read in the step S6, to the navigation micro-computer 21 is performed and then the situation of this routine is returned. For example, when the content type, the notification way and the high priority function are set as "notification of only a cause of unsatisfaction of stopping the engine", "notification by image display" and "priority given to the function of notifying of economy running information" respectively, notifying control information including information of the cause of unsatisfaction of stopping the engine in the information concerned with the unsatisfied stop condition, a control signal for displaying the cause information as an image and a control signal for giving high priority to the function of notifying economy running information is sent to the navigation micro-computer 21.

On the other hand, when the judgment in the step S3 makes a decision that the economy running condition is satisfied, the situation of this routine goes to step S10. In the step S10, an engine automatic stopping process is performed, that is, a process of outputting a fuel cutting control signal from the economy running ECU 10 to the engine ECU 11 is performed to stop the engine and then the situation of this routine is returned.

On the other hand, when the judgment in the step S2 makes a decision that economy running control is executed, that is, the engine is stopped automatically (ready to restart) by economy running control, the situation of this routine goes to step S11. In the step S11, a judgment is made as to whether the economy running recovery condition, that is, the engine start condition (starting condition) is satisfied or not. When a decision is made that the economy running recovery condition is satisfied, the situation of this routine goes to step S12. In the step S12, an engine restarting process, that is, a process of outputting a control signal from the economy running ECU 10 to the engine ECU 11 to restart fuel supply to thereby restart the engine is performed to restart the engine and then the situation of this routine goes to step S13.

In the step S13, a judgment is made as to whether the economy running recovery condition is a starting condition not requiring any user's operation of restarting the engine (e.g. a stopped state canceling operation such as an accelerator pedal stepping operation or a brake pedal releasing operation) (e.g. whether the electricity stored in the battery is lower than a predetermined level or not). When a decision is made that the economy running recovery condition is not a starting condition not requiring the user's operation of restarting the engine, that is, the engine is restarted intentionally by the user's recovery operation, the situation of this routine is returned.

On the other hand, when the judgment in the step S13 makes a decision that the economy running recovery condition is a starting condition not requiring any user's operation for restarting the engine, the situation of this routine goes to step S14. In the step S14, "information concerned with the satisfied starting condition" corresponding to the starting condition triggering the restart is read from the ROM and then the situation of this routine goes to step S15.

In the step S15, information for setting the content type of information (information concerned with the satisfied starting condition) to be notified to the user, the notification way and the high priority function is read. In the next step S16, a judgment is made as to whether the content type is set as "no information to be notified to the user" or not. When the judgment makes a decision that the content type is set as "no information to be notified to the user", the situation of this routine is returned.

On the other hand, when the judgment in the step S16 makes a decision that the content type is not set as "no information to be notified to the user", that is, the content type is set as "notification of a cause of the restart of the engine", the situation of this routine goes to step S17.

In the step S17, a notifying control process is performed for the navigation apparatus 20, that is, a process of sending notifying control information including setting information concerned with the content type, the notification way and the high priority function read in the step S15 and information concerned with the satisfied starting condition read in the step S14, to the navigation micro-computer 21 is performed and then the situation of this routine is returned. For example, when the content type, the notification way and the high priority function are set as "notification of only a cause of the restart of the engine", "notification by voice output" and "function of notifying economy running information" respectively, a process of sending notifying control information including information of the cause of the restart of the engine in information concerned with the satisfied starting condition, a control signal for outputting the information of the cause as voice and a control signal for giving high priority to the function of notifying economy running information, to the navigation micro-computer 21 is performed.

On the other hand, when the judgment in the step S11 makes a decision that the economy running recovery condition, that is, the condition for restarting the engine is unsatisfied, the situation of this routine goes to step S18. In the step S18, an engine stopped state continuing process, that is, a process of outputting a control signal to the engine ECU 11 to continue the stopped state of the engine is performed and then the situation of this routine is returned.

Figure 8:
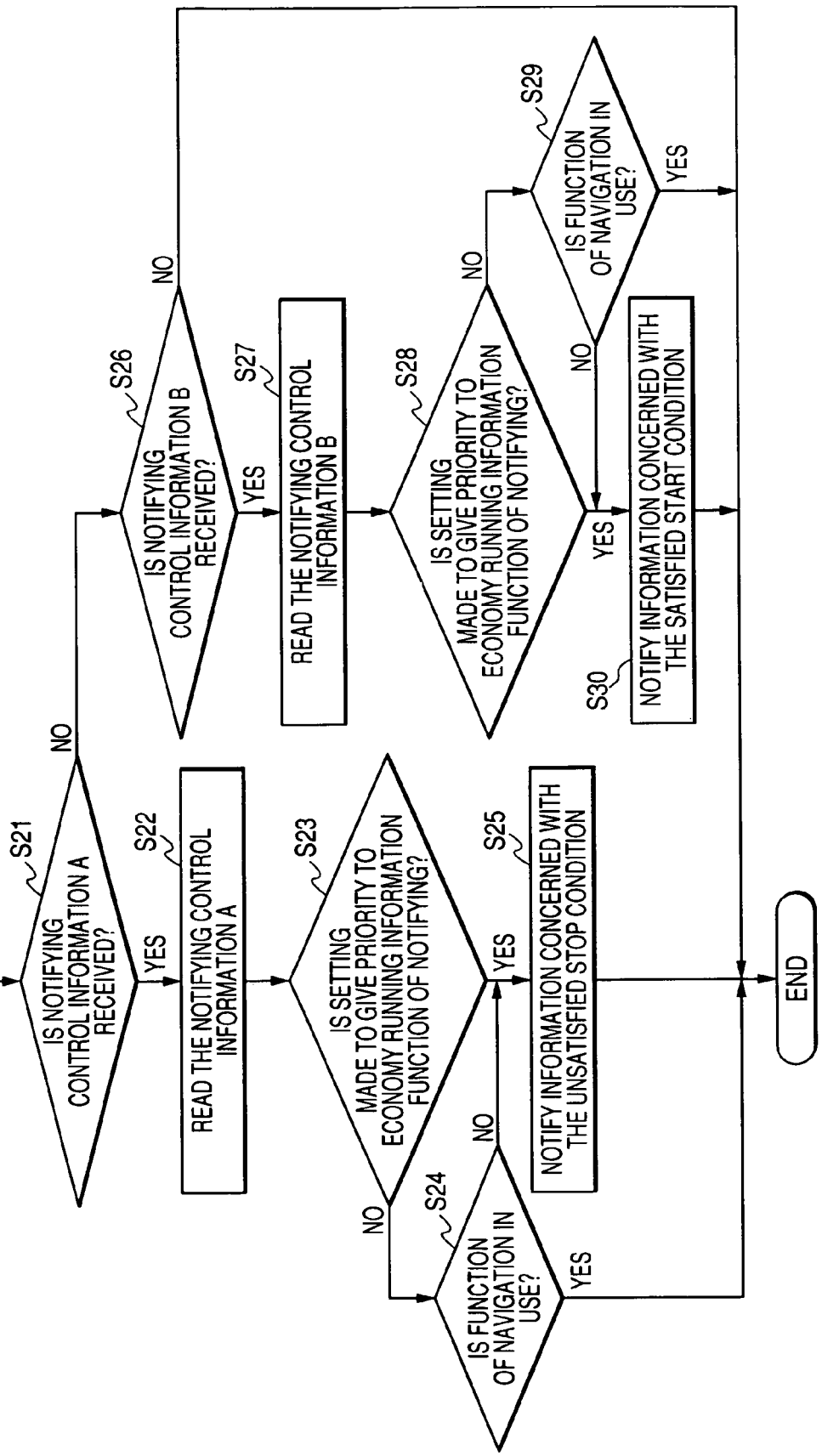
FIG. 8 is a flow chart showing a processing operation performed by a navigation micro-computer in the navigation apparatus constituting the economy running system according to Embodiment 1.

Next, a processing operation performed by the navigation micro-computer 21 of the navigation apparatus 20 constituting the economy running system according to Embodiment 1 will be described with reference to FIG. 8 which is a flow chart. Incidentally, this processing operation is executed when notifying control information is received from the economy running ECU 10.

First, in step S21, a judgment is made as to whether notifying control information (notifying control information A) of information concerned with the unsatisfied stop condition is received from the economy running ECU 10 or not. When a decision is made that notifying control information A of information concerned with the unsatisfied stop condition is received, the situation of this routine goes to step S22. In the step S22, notifying control information A of information concerned with the unsatisfied stop condition is read. In the next step S23, a judgment is made as to whether the high priority function is set as "the function of notifying economy running information" or not. When a decision is made that the priority function is not set as "the function of notifying economy running information", that is, the priority function is set as "the function of navigation", the situation of this routine goes to step S24. In the step S24, a judgment is made as to whether the function of navigation is in use (e.g. for map display or route guide) or not. When a decision is made that the function of navigation is in use, this routine is terminated without execution of the process of notifying economy running information.

On the other hand, when the judgment in the step S24 makes a decision that the function of navigation is not in use (e.g. the other audio function than the function of navigation is in use), the situation of this routine goes to step S25. When the judgment in the step S23 makes a decision that the function of notifying economy running information is given high priority, the situation of this routine goes to step S25.

In the step S25, a process of notifying information concerned with the unsatisfied stop condition to the user on the basis of the other setting information contained in the notifying control information A and information concerned with the unsatisfied stop condition is performed. For example, the content type is set as "notification of a cause of unsatisfaction of stopping the engine" and "notification of an answer to cope with the unsatisfaction" and the notification way is set as "notification by image display", the cause of unsatisfaction of stopping the engine and the answer to cope with the unsatisfaction are displayed in the display form shown in FIG. 9 on the display portion 22 for a predetermined time and then this routine is terminated.

On the other hand, when the judgment in the step S21 makes a decision that notifying control information A of information concerned with the unsatisfied stop condition is not received, the situation of this routine goes to step S26. In the step S26, a judgment is made as to whether notifying control information (notifying control information B) of information concerned with the satisfied starting condition is received from the economy running ECU 10 or not. When a decision is made that notifying control information B of information concerned with the satisfied starting condition is not received, this routine is terminated. On the other hand, when a decision is made that notifying control information B of information concerned with the satisfied starting condition is received, the situation of this routine goes to step S27.

In the step S27, notifying control information B of information concerned with the satisfied starting condition is read. In the next step S28, a judgment is made as to whether the high priority function is set as "the function of notifying economy running information" or not. When a decision is made that the priority function is not set as "the function of notifying economy running information", that is, the priority function is set as "the function of navigation", the situation of this routine goes to step S29. In the step S29, a judgment is made as to whether the function of navigation is in use (e.g. for map display or route guide) or not. When a decision is made that the function of navigation is in use, this routine is terminated without execution of the process of notifying economy running information.

On the other hand, when the judgment in the step S29 makes a decision that the function of navigation is not in use, the situation of this routine goes to step S30. On the other hand, when the judgment in the step S28 makes a decision that the high priority function is set as "the function of notifying economy running information", the situation of this routine goes to step S30.

In the step S30, information concerned with the satisfied starting condition is notified to the user on the basis of the other setting information contained in the notifying control information B and information concerned with the satisfied starting condition. For example, when the content type and the notification way are set as "notification of the cause of the restart of the engine" and "notification by voice output" respectively, a process of outputting the cause of the restart of the engine as voice guide information (e.g. voice guide "restarted because of lowering of electricity stored in the battery") from the voice output portion 26 is performed and then this routine is terminated.

In the economy running system according to Embodiment 1, when a condition for stopping the engine is unsatisfied in spite of the vehicle stops, that is, when the engine cannot be stopped though the vehicle stops, information concerned with the unsatisfied stop condition is notified to the user. Accordingly, information concerned with the unsatisfied stop condition can be notified to the user, so that the user can grasp the reason why the engine cannot be stopped in spite of the vehicle stops. Accordingly, user's understanding and comfort with respect to the economy running system can be deepened so that the user can be prevented from confusing the unsatisfied stop condition with an accident.

Moreover, because the unsatisfied stop condition (i.e. unsatisfied one of conditions for stopping the engine) is notified to the user, the user can grasp the cause of unsatisfaction of stopping the engine so that the user can understand the mechanism of the economy running system correctly. Moreover, because the answer to lead the unsatisfied stop condition into a satisfied condition (i.e. the answer to lead unsatisfied one of engine stop conditions into a satisfied condition) is notified to the user, the user can be urged to lead the unsatisfied stop condition into a satisfied condition so that the user can efficiently use functions provided in the economy running system to thereby bring the effect (e.g. a fuel saving effect due to increase in number of automatic stopped states of the engine) of economy running control into full play even if the user is a general user not having sufficient knowledge of the economy running system.

When a certain starting condition (a starting condition not requiring any user's operation of restarting the engine in this case) is satisfied to restart the engine, information concerned with the satisfied starting condition is notified to the user. Accordingly, when the engine is restarted without necessity of the user's operation of restarting the engine, that is, regardless of the user's intention, the user can grasp the reason why the engine is restarted, so that user's understanding and comfort with respect to the economy running control (especially, control at the restarting time) can be deepened more greatly.

Because the content type of information concerned with the unsatisfied stop condition is switched in accordance with information inputted through the setting screen for inputting the content type, the content type can be switched in accordance with information inputted through the setting screen. The user can switch the content type arbitrarily in accordance with the degree of user's understanding of the economy running system, that is, in accordance with the necessity of notification or the like, so that the content type according to the user's demand and request can be used.

Because the notification way of information concerned with the unsatisfied stop condition is switched in accordance with information inputted through the setting screen for inputting the notification way, the notification way can be switched in accordance with information inputted through the setting screen. The user can switch the notification way arbitrarily in accordance with the user's favorite etc., so that the notification way according to the user's demand and request can be used.

Because configuration is made so that information concerned with the unsatisfied stop condition and information concerned with the satisfied start condition are notified to the user through the navigation apparatus 20, the image output function and the voice output function provided in the navigation apparatus 20 can be used so that information concerned with the unsatisfied stop condition and information concerned with the satisfied start condition can be notified to the user so as to be easy to understand.

Because configuration is made so that the function to be given high priority can be switched on the basis of information inputted through the setting screen for inputting the priority function, either of the function of notifying the notification information to the user and the function of navigation can be selected as the function to be given high priority on the basis of information inputted through the setting screen for inputting the priority function. Accordingly, the user can switch the priority function arbitrarily in accordance with the user's demand.

According to the navigation apparatus 20, a process of notifying information etc. concerned with the unsatisfied stop condition to the user is performed on the basis of the notifying control information given from the economy running ECU 10. Accordingly, information concerned with the unsatisfied stop condition can be notified to the user through the navigation apparatus 20, so that the function of the navigation apparatus 20 can be improved more greatly.

An economy running system according to Embodiment 2 will be described below. Incidentally, the configuration of the economy running system according to Embodiment 2 is substantially the same as that of the economy running system shown in FIG. 1 except the economy running ECU and the navigation micro-computer. While the economy running ECU 10A and the navigation micro-computer 21A having different functions are referred to by different numerals, constituent members having the same functions are referred to by the same numerals for the sake of omission of description.

In the economy running system according to Embodiment 1, the priority function can be set by the user suitably through the "priority function setting" screen (see FIG. 6) displayed on the display portion 22 of the navigation apparatus 20 so that the set information is stored in the economy running ECU 10. On the other hand, the economy running system according to Embodiment 2 is different from the economy running system according to Embodiment 1 in that the function to be given priority, that is, either of the function of notifying economy running information and the function of navigation as the function to be given priority is not set by the user but decided (switched) suitably in accordance with surroundings of the vehicle at that time on the basis of information concerned with the position of the vehicle estimated by the navigation apparatus 20A and information containing various kinds of detected states of the vehicle.

Figure 7:
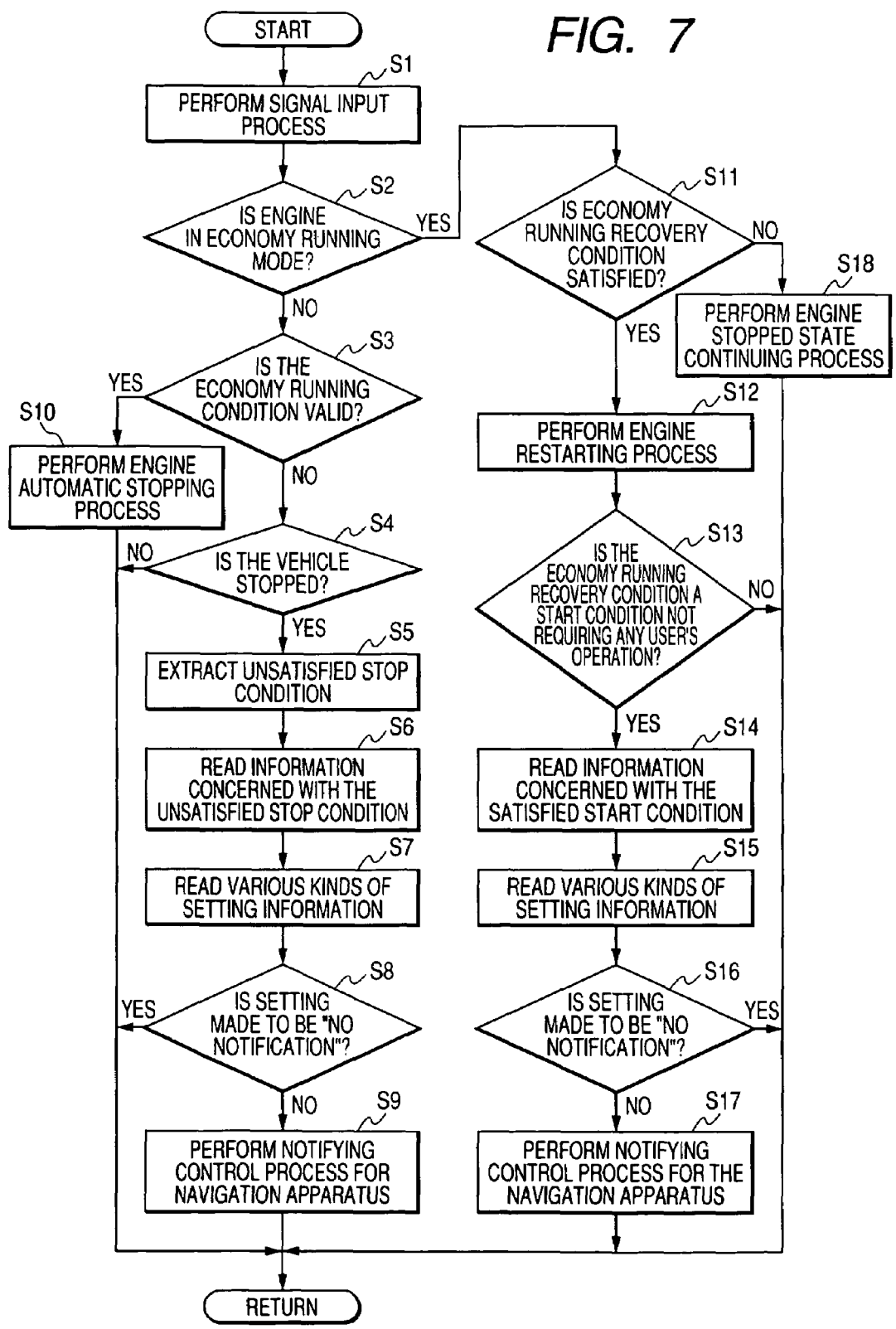
FIG. 7 is a flow chart showing a processing operation performed by a micro-computer in the economy running ECU constituting the economy running system according to Embodiment 1.

Incidentally, the economy running information notifying control processing operation performed by the economy running ECU 10 constituting the economy running system according to Embodiment 2 is substantially the same as the processing operation shown in FIG. 7 and the description thereof will be omitted here.

A processing operation performed by the navigation micro-computer 21A of the navigation apparatus 20A constituting the economy running system according to Embodiment 2 will be described below with reference to FIG. 10 which is a flow chart.

First, in step S31, a judgment is made as to whether notifying control information (notifying control information A') of information concerned with the unsatisfied stop condition is received from the economy running ECU or not. When a decision is made that notifying control information A' of information concerned with the unsatisfied stop condition is received, the situation of this routine goes to step S32.

In the step S32, a judgment is made as to whether the function of navigation is in use (e.g. for map display of the position of the vehicle or route guide) or not. When a decision is made that the function of navigation is not in use, the situation of this routine goes to step S35. On the other hand, when a decision is made that the function of navigation is in use, the situation of this routine goes to step S33.

In the step S33, the position information of the vehicle and the situation of the vehicle (such as the remaining amount of fuel, the operating situation of winkers, etc.) are acquired. In the next step S34, a judgment is made on the basis of the acquired information as to whether the vehicle is in a situation that the priority for automatically stopping the engine is low (e.g. the vehicle is located in the head of a right turn lane of a crossroads) or not. When a decision is made that the vehicle is in a situation that the priority for stopping the engine is low, that is, the vehicle is in a situation that the function of navigation can be given high priority, the function of navigation is given high priority and this routine is terminated without notification of information concerned with the unsatisfied stop condition. On the other hand, when a decision is made in the step S34 that the vehicle is not in a situation that the priority for stopping the engine is low, that is, the vehicle is in a situation that the economy running information function of notifying can be given high priority, the situation of this routine goes to step S35.

In the step S35, notifying control information A' of information concerned with the unsatisfied stop condition is read. In the next step S36, information concerned the unsatisfied stop condition is notified to the user on the basis of setting information (information for setting the content type and the notification way) contained in the notifying control information A' and information concerned with the unsatisfied stop condition. For example, when the content type and the notification way are set as "notification of only the cause of unsatisfaction of stopping the engine" and "notification by image display and voice" respectively, the cause of the unsatisfaction of stopping the engine is displayed in the display form shown in FIG. 11 on the display portion 22 for a predetermined time while guide voice (e.g. voice "the engine cannot be stopped automatically because electricity stored in the battery is lowered") is outputted through the voice output portion 26. Then, this routine is terminated.

On the other hand, when the judgment in the step S31 makes a decision that notifying control information A' of information concerned with the unsatisfied stop condition is not received, the situation of this routine goes to step S37. In the step S37, a judgment is made as to whether notifying control information (notifying control information B') of information concerned with the satisfied starting condition is received from the economy running ECU 10 or not. When a decision is made that notifying control information B' of information concerned with the satisfied starting condition is not received, this routine is terminated. On the other hand, when a decision is made that notifying control information B' of information concerned with the satisfied starting condition is received, the situation of this routine goes to step S38.

In the step S38, a judgment is made as to whether the function of navigation is in use or not. When a decision is made that the function of navigation is not in use, the situation of this routine goes to step S41. On the other hand, when a decision is made that the function of navigation is in use, the situation of this routine goes to step S39.

In the step S39, the position information of the vehicle and the situation of the vehicle (such as the remaining amount of fuel, the operating situation of winkers, etc.) are acquired. In the next step S40, a judgment is made on the basis of the acquired information as to whether the vehicle is in a situation that the priority for use of the function of navigation is high or not (e.g. whether the vehicle is running on the road for the first time or not). When a decision is made that the vehicle is in a situation that the priority for use of the function of navigation is high, this routine is terminated without notification of information concerned with the satisfied starting condition. On the other hand, when the judgment in the step S40 makes a decision that the vehicle is not in a situation that the priority for use of the function of navigation is high, that is, the function of navigation need not be given priority, the situation of this routine goes to step S41.

In the step S41, notifying control information B' of information concerned with the satisfied starting condition is read. In the next step S42, information concerned with the satisfied starting condition is notified to the user on the basis of setting information (information for setting the content type and the notification way) contained in the notifying control information B' and information concerned with the satisfied starting condition. For example, when the content type and the notification way are set as "notification of only the cause of the restart of the engine" and "notification by voice" respectively, the cause of the restart of the engine is outputted as guide voice through the voice output portion 26. Then, this routine is terminated.

In the economy running system according to Embodiment 2, the function to be given high priority is switched on the basis of information containing information concerned with the position of the vehicle estimated by the navigation apparatus 20A. Accordingly, the system can be provided as a system in which the function to be given high priority can be switched suitably in accordance with information including information concerned with the position of the vehicle estimated by the navigation apparatus 20A (such as the situation of the road on which the vehicle is located, the peripheral facilities and the state of the vehicle at that time), that is, in consideration of priority etc. for automatically stopping the engine.

According to the navigation apparatus 20A, a judgment is made as to which is given high priority, the economy running information function of notifying or the function of navigation. When a decision is made that the function of navigation is given high priority, the economy running information function of notifying is not used. Accordingly, when the priority for use of the function of navigation is high, the economy running information function of notifying is not used so that the function of navigation can be prevented from being disturbed by the function of notifying.

According to the navigation apparatus 20A, a judgment is made as to which function is given high priority, on the basis of priority for automatically stopping the engine. Accordingly, in a situation in which the priority for automatically stopping the engine is high (e.g. in a situation in which it is particularly necessary to save fuel), the economy running information function of notifying can be given high priority. On the other hand, in a situation in which the priority for automatically stopping the engine is low (e.g. in a situation in which rapid acceleration is required because the vehicle is located in the head of a right turn lane of a crossroads), the function of navigation can be given high priority. The priority function can be switched automatically in accordance with surroundings of the vehicle, that is, while the function to be given high priority by the user is predicted.

Figure 10:
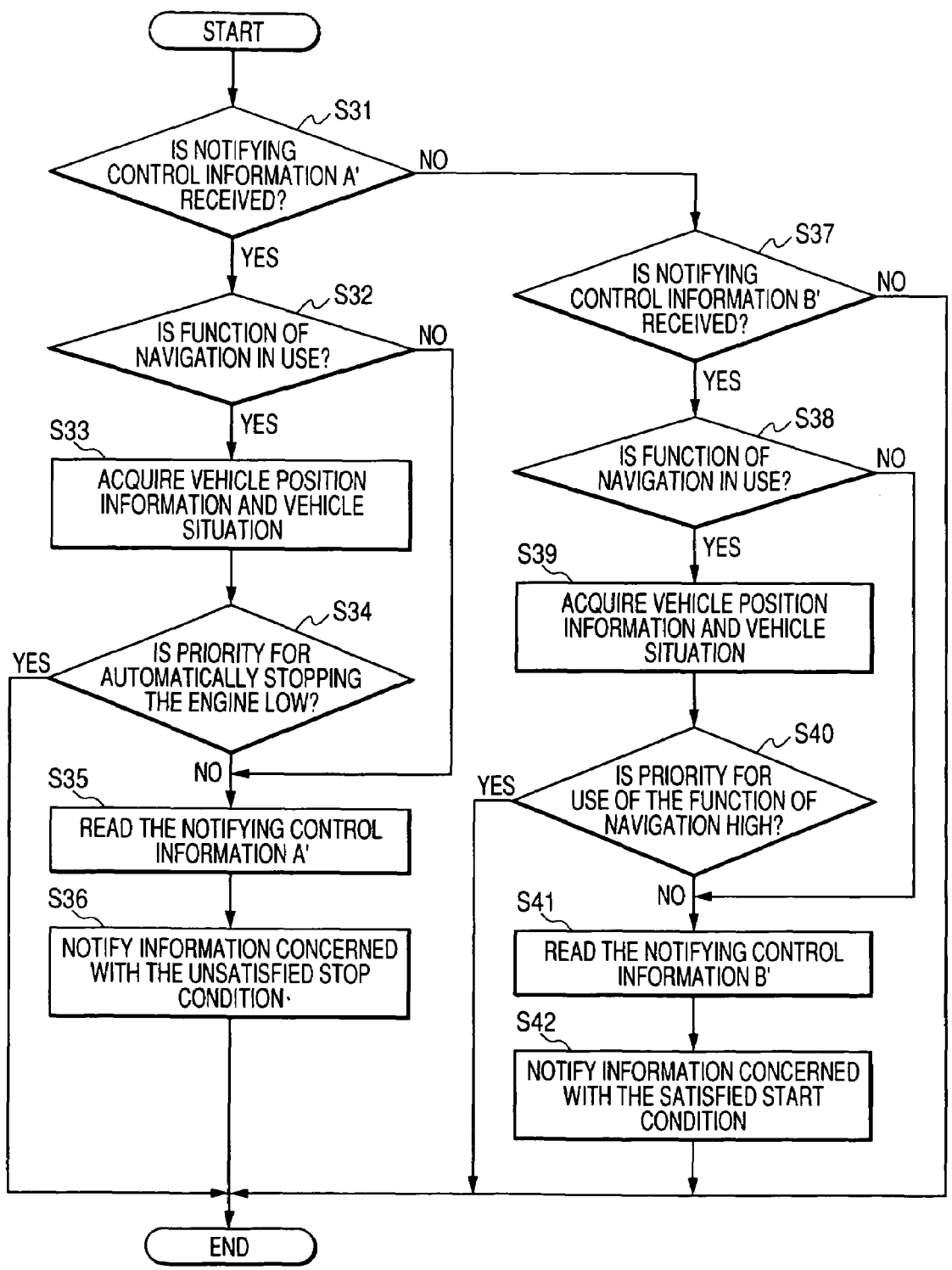
FIG. 10 is a flow chart showing a processing operation performed by a navigation micro-computer in a navigation apparatus constituting an economy running system according to Embodiment 2.

Incidentally, in processing by the navigation micro-computer 21A in the navigation apparatus 20 constituting the economy running system according to Embodiment 2 shown in FIG. 10, a process having a strong tendency to give high priority to the economy running information function of notifying is performed. That is, a judgment in the step S34 is made as to whether the vehicle is in a situation that the priority for automatically stopping the engine is low or not. In another embodiment, the step S34 may be replaced so that a judgment is made as to whether the vehicle is in a situation that the priority for automatically stopping the engine is high (e.g. the remaining amount of fuel is small but there is no oil depot near the vehicle) or not. When a decision is made that the vehicle is in a situation that the priority for automatically stopping the engine is high, that is, the economy running information function of notifying needs to be given high priority to execute automatic stop of the engine actively, the situation of this routine goes to step S35. On the other hand, when a decision is made that the vehicle is not in a situation that the priority for automatically stopping the engine is high, that is, the necessity of giving priority to the economy running information function of notifying is not high, this routine is terminated without execution of the economy running information notifying process.

The step S40 in FIG. 10 may be replaced so that a judgment is made as to whether the vehicle is in a situation that the priority for use of the function of navigation is low (e.g. the vehicle is running on the road through which the vehicle passed in the past) or not. When a decision is made that the vehicle is in a situation that the priority for use of the function of navigation is low, the situation of this routine goes to step S41. On the other hand, when a decision is made that the vehicle is not in a situation that the priority for use of the function of navigation is low, that is, the function of navigation needs to be given priority, this routine is terminated without execution of the economy running information notifying process. By such a judgment process, a process having a strong tendency to give priority to the function of navigation can be performed.

What is claimed is:

1. An economy running system having:
 a function of stopping an internal combustion engine of a vehicle when the vehicle stops and all of stop conditions are satisfied;

a function of restarting the internal combustion engine of the vehicle, the economy running system comprising:

a control unit that judges whether the vehicle stops or not, and judges whether each of the stop conditions is satisfied or not; and a notification unit, wherein when the control unit judges that the vehicle stops and that at least one of the stop conditions is not satisfied so as to define at least one unsatisfied stop condition, the control unit causes the notification unit to notify to a user first notification information that includes an identity of the at least one unsatisfied stop condition so that the user identifies which stop condition is not satisfied.

2. The economy running system according to claim 1, wherein the first notification information includes information about how to satisfy the at least one unsatisfied stop condition.

3. The economy running system according to claim 1, wherein the economy running system restarts the internal combustion engine of the vehicle when at least one of start conditions is satisfied;

wherein the control unit judges whether each of the start conditions is satisfied; and wherein when at least one of the start conditions is satisfied and the internal combustion engine restarts, the control unit causes the notification unit to notify second notification information concerned with the at least one of the start conditions.

4. The economy running system according to claim 3, wherein the start conditions include a condition which does not require a user to perform an operation for restarting the internal combustion engine.

5. The economy running system according to claim 1, wherein a content type of the first notification information is changeable to another one of a plurality of the content types of the first notification information.

6. The economy running system according to claim 5, further comprising:

an input unit that inputs one of the content types;

wherein the first notification information is notified according to the one of the content types.

7. The economy running system according to claim 1, wherein a way of notifying the first notification information is changeable to another one of a plurality of ways of notifying the first notification information.

8. The economy running system according to claim 7, further comprising:

an input unit that inputs one of the ways of notifying;

wherein the first notification information is notified by the one of the ways of notifying.

9. The economy running system according to claim 1, wherein the notification unit includes a navigation apparatus; and wherein at least the first notification information is notified through the navigation apparatus.

10. The economy running system according to claim 9, wherein it is changeable which one of a function of notifying the first notification information and a function of navigation by the navigation apparatus is given a higher priority than the other.

11. The economy running system according to claim 10, further comprising:

an input unit that inputs information about which one of the function of notifying the first notification information and the function of navigation is given a higher priority.

12. The economy running system according to claim 10, wherein which one of the function of notifying the first notification information and the function of navigation changes based on information concerned with a position of the vehicle estimated by the navigation apparatus.

13. An economy running controller performing:

a control for stopping an internal combustion engine of a vehicle when the vehicle stops and all of stop conditions are satisfied; and a control for restarting the internal combustion engine of the vehicle, the economy running controller comprising:

a stop judging unit that judges whether the vehicle stops or not, and judges whether each of the stop conditions is satisfied or not; and a notification control unit;

wherein when the stop judging unit judges that the vehicle stops and judges that at least one of the stop conditions is not satisfied so as to define at least one unsatisfied stop condition, the notification control unit performs control for notifying to a user a first notification information that includes an identity of the at least one unsatisfied stop condition so that the user identifies which stop condition is not satisfied.

14. The economy running controller according to claim 13, wherein the notification control unit performs control for notifying to the user the first notification information through an on-vehicle apparatus having at least one of an image output function and a voice output function.

15. The economy running controller according to claim 14, wherein the economy running controller restarts the internal combustion engine of the vehicle, when at least one of start conditions is satisfied, the economy running controller further comprising:

a restart judging unit that judges whether each of the start conditions is satisfied;

wherein when the restart judging unit judges that at least one of the start conditions is satisfied and the internal combustion engine restarts, the notification control unit performs control for notifying to the user a second notification information concerned with the at least one of the start conditions.

16. The economy running controller according to claim 15, wherein the notification control unit performs control for notifying to the user the second notification information through an on-vehicle apparatus having at least one of an image output function and a voice output function.

17. A navigation apparatus being connected to an economy running controller performing:

a control for stopping an internal combustion engine of a vehicle when the vehicle stops and all of stop conditions are satisfied; and a control for restarting the internal combustion engine of the vehicle, the economy running controller comprising:

a stop judging unit that judges whether the vehicle stops or not, and judges whether each of the stop conditions is satisfied or not; and a notification control unit;

wherein when the stop judging unit judges that the vehicle stops and judges that at least one of the stop conditions is not satisfied so as to define at least one unsatisfied stop condition, the notification control unit transmits a notification control signal to the navigation apparatus, the navigation apparatus comprising:

a notification unit that notifies to the user first notification information that includes an identity of the at least one unsatisfied stop condition based on the notification control signal from the economy running controller so that the user identifies which stop condition is not satisfied.

18. The navigation apparatus according to claim 17, further comprising:
a content type setting unit that sets a content type of the first notification information.

19. The navigation apparatus according to claim 17, further comprising:
a notification way setting unit that sets a way of notifying the first notification information.

20. The navigation apparatus according to claim 17, further comprising:
a priority setting unit that sets which one of the function of notifying the first notification information and a function of navigation by the navigation apparatus is given a higher priority.

21. The navigation apparatus according to claim 17, further comprising:
a priority judging unit that judges which one of the function of notifying the first notification information and a function of navigation by the navigation apparatus is given a higher priority;
wherein when the priority judging unit that judges the function of navigation is given a higher prior than the other, the first notification information is not notified by the notification unit.

22. The navigation apparatus according to claim 17,
wherein the priority judging unit judges which one of the function of notifying the first notification information and the function of navigation by the navigation apparatus is given a higher priority based on a priority of stopping the internal combustion engine.

* * * * *